Dec. 9, 1969     E. FUX     3,482,275
OSCILLATING WINDSHIELD WIPER
Filed July 17, 1967
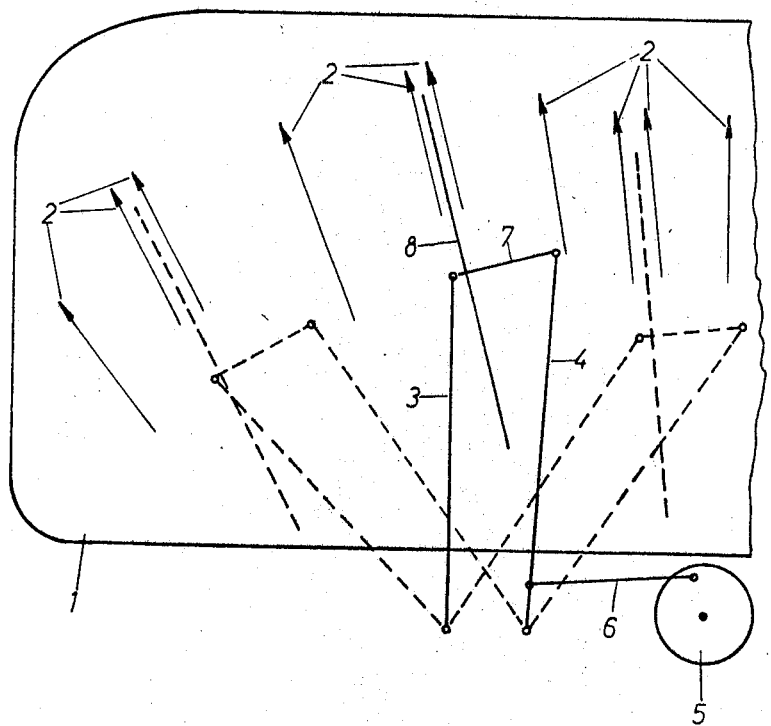
INVENTOR
ERICH FUX
BY *Edmund M. Jaskiewicz*
ATTORNEY

United States Patent Office 3,482,275
Patented Dec. 9, 1969

3,482,275
OSCILLATING WINDSHIELD WIPER
Erich Fux, Munich, Germany, assignor to Knorr-Bremse G.m.b.H., a limited-liability corporation of Germany
Filed July 17, 1967, Ser. No. 653,737
Claims priority, application Germany, Aug. 12, 1966, K 600,112
Int. Cl. B60s 1/04
U.S. Cl. 15—250.32          2 Claims

ABSTRACT OF THE DISCLOSURE

A windshield wiper for high-speed vehicles with the blade being rigidly mounted on a cross-bar pivotally connecting the ends of a pair of pivotally mounted arms in such a manner that the blade is parallel to the varying directions of air flow on different parts of the windshield.

---

The present invention relates to an oscillating windshield wiper for rapidly moving vehicles, more particularly, to the mounting of the wiper blade on the actuating wiper arms so that the blade is parallel to the varying directions of air flow over different portions of the windshield.

Many different forms of windshield wiper arrangements have been devised for oscillating a wiper blade over the windshield of a vehicle. Such windshield wipers generally comprise a wiper arm which has one end pivotally mounted on the vehicle and a wiper blade attached to the other end of the arm. The arm is then oscillated to move the wiper blade over the windshield with the blade remaining substantially parallel to the wiper or remains in an approximately vertical position during movement on a curved windshield. Such windshield wipers operated satisfactorily on relatively slow moving vehicles. However, when employed on high-speed vehicles, the flow of air over the windshield was in varying directions and tended to lift the windshield wiper blades from the windshield. It was therefore proposed to mount various plane or guide surfaces on either the wiper arm or blade to oppose the tendency of the air flow lifting the wiper blade during movement of the vehicle. However, such arrangements remained effective only up to certain speeds of the vehicle above which the wiper blades were still lifted from the windshield or too heavy pressures were exerted by the blades against the windshield. In addition, at high vehicle speeds the air flow acting upon the plane surfaces tended to impose an excessively heavy load on the mechanism for driving the wiper arm.

It is therefore the principal object of the present invention to provide a novel and improved oscillating windshield wiper.

It is another object of the present invention to provide an oscillating windshield wiper particularly adapted for high-speed vehicles.

It is a further object of the present invention to provide a windshield wiper for high-speed vehicles wherein the wiper blade is positioned parallel to the varying directions of air flow over different portions of the windshield as the blade moves over the windshield.

In the oscillating windshield wiper arrangement according to the present invention, the wiper blade will always press upon the windshield with substantially equal force even at high vehicle speeds and at high rates of flow of air over the windshield. In addition, the blade will exert this constant force against the windshield independently of the speed of the vehicle and the mechanism for operating the wiper arrangement will experience very little, if any, additional load regardless of the forces exerted by the air flowing over the windshield.

In one embodiment of the present invention, there may be provided a pair of wiper arms pivotally connected at their corresponding one ends to the vehicle and having their other ends pivotally connected by a cross-bar so as to define a substantially trapezoidal shape. A wiper blade is rigidly and non-rotatably mounted on the cross-bar. The wiper arms are then oscillated in unison and the blade is moved over the windshield in such a manner that the blade remains substantially parallel to the direction of the air flow over different portions of the windshield. The position of the wiper blade on the windshield as it oscillates over the surface is independent of air currents resulting from the movement of the vehicle. During its oscillatory movement, the wiper blade pivots with respect to the wiper arms about an axis which is perpendicular to the wiper arms.

Other objects and advantages of the present invention will be apparent upon reference to the accompanying description when taken in conjunction with the single drawing which shows schematically the windshield wiper according to the present invention in various positions on the windshield.

A specific embodiment of the present invention will next be described in detail with reference to the single figure of drawings.

The windshield of a vehicle incorporating the windshield wiper of the present invention is indicated at 1. The direction of air flow over the windshield during movement of the vehicle has been determined by tests. Woolen threads are attached over various portions of the windshield and the directions taken by the threads under influence of air flowing over the windshield are marked on the windshield by the arrows 2.

While not limited thereto, the windshield wiper described herein is particularly adapted for high speed railway locomotives. Accordingly, windshield 1 is illustrated as comprising the left of a windshield when viewing the vehicle from the front. With this relative location of the windshield in mind, the directions of air flow over the different portions of the windshield as indicated by the arrows 2 will be self-evident. In general, these same directions of air flow will prevail for different vehicles and variations in the shape of the windshield.

The wiper arm assembly comprises two wiper arms 3 and 4 and have their lower ends pivotally mounted on the vehicle a fixed distance apart. Adjacent the pivot connection of arm 4 there is pivotally connected a connecting arm or rod 6 which has its other end pivotally connected to a crank 5. The crank 5 is actuated by a suitable mechanism.

Arms 3 and 4 are of unequal length and have their upper ends slightly divergent as may be seen in the drawing. The upper ends are pivotally connected by a cross-bar 7 so that the arrangement of arms 3 and 4 and cross-bar 7 defines a substantially trapezoidal shape. A wiper blade 8 is rigidly and non-rotatably secured to cross-bar 7 close to the pivotal connection of the cross-bar with the arm 3.

In operation, the wiper arms 3 and 4 will be oscillated in unison by the mechanism comprising crank 5 and connecting rod 6. As the wiper arms 3 and 4 are oscillated into the positions shown in the dash lines the wiper blade 8 will also be moved to the corresponding dash lines positions. As may be seen from the drawing, the longitudinal axis of wiper blade 8 will be substantially parallel to the air flow arrows 2 as indicated on the different portions of the windshield. During the movement of the vehicle, the resulting flow of air over the windshield will not impinge on any surface of the windshield wiper arrangement which would tend to lift the wiper blade away from the windshield, except for perhaps the negligible narrow edge surface of the blade. In the absence of any such plane surface upon which the moving air can impinge, the air flow will not impose any additional load upon the wiper actuating mechanism. It is therefore apparent that the oscillating windshield wiper according to the invention will remain independent of air flow currents over the windshield even during high-speed travel of the vehicle and high rates of flow of air over the windshield.

Thus it can be seen that the present invention provides a windshield wiper wherein the wiper blade is rigidly mounted on a cross-bar pivotally connected between two wiper arms so that during the oscillating movement of the wiper arms, the wiper blade pivots about an axis which is substantially perpendicular to the wiper arms. With this construction, the problem of maintaining the wiper blade in contact with the windshield at high speeds of the vehicle and during high rates of flow of air over the windshield is solved in a simple yet effective manner.

What is claimed is:

1. A windshield wiper arrangement in a high-speed vehicle for maintaining the wiper blade parallel to the direction of air flow over a windshield at an angle to the direction of travel so as to have varying directions of air flow thereon during movement of the vehicle, and comprising a pair of spaced wiper arms each having one end thereof pivotally mounted at a fixed distance apart to oscillate in a direction substantially parallel to the windshield, said arms having unequal fixed lengths and diverging slightly from their pivotally mounted ends, a cross-bar pivotally connecting the other ends of said wiper arms so that said arms move in unison, and a wiper blade rigidly mounted on said cross-bar and perpendicular thereto in a non-parallel relationship to each of said arms so as to be pivotable about an axis perpendicular to said wiper arms and to move over the windshield in a non-symmetrical deflecting area.

2. A windshield wiper arrangement as claimed in claim 1 with said wiper blade being mounted on said cross-bar adjacent to a pivotal connection thereof with a wiper arm.

References Cited

UNITED STATES PATENTS

| | | | |
|---|---|---|---|
| 1,264,692 | 4/1918 | Shuler | 15—250.23 |
| 1,571,516 | 2/1926 | Folberth et al. | 15—250.23 |
| 2,393,194 | 1/1946 | Sacchini | 15—250.3 |

PETER FELDMAN, Primary Examiner

U.S. Cl. X.R.

15—250.23